S. C. BRINSER.
Horse Rake.
No. 38,281.
Patented April 28, 1863.
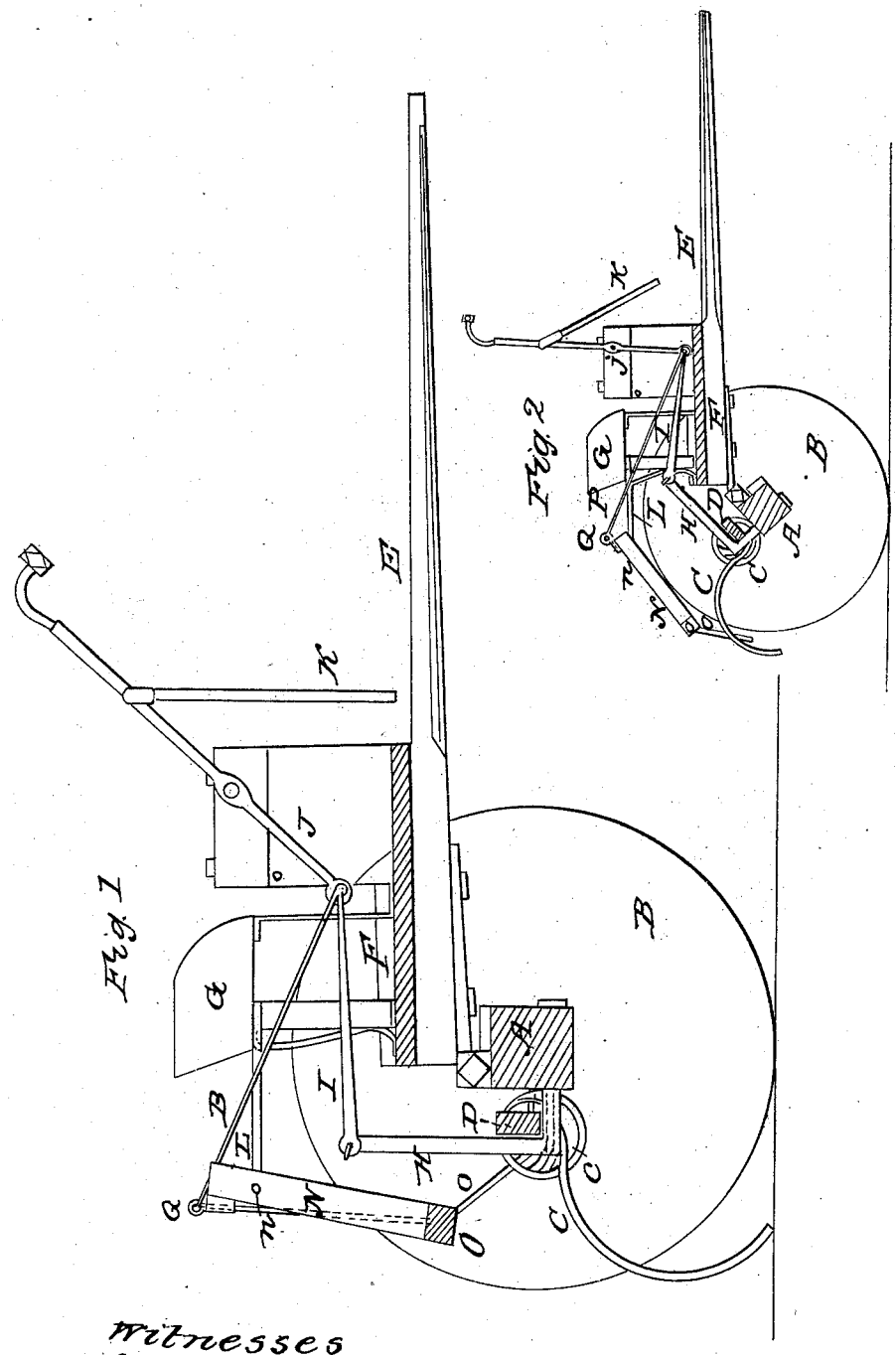

UNITED STATES PATENT OFFICE.

S. C. BRINSER, OF MIDDLETOWN, PENNSYLVANIA.

IMPROVEMENT IN HORSE-RAKES.

Specification forming part of Letters Patent No. 38,281, dated April 28, 1863.

*To all whom it may concern:*

Be it known that I, S. C. BRINSER, of Middletown, in the county of Dauphin and State of Pennsylvania, have invented a new and useful Improvement in Horse-Rakes; and I do hereby declare the following to be a full and exact description of the same, reference being had to the accompanying drawings, making part of this specification, in which—

Figure 1 is a vertical longitudinal section of my improved rake, showing the teeth in their working position and the clearer retracted. Fig. 2 is a section on a smaller scale, showing the teeth elevated and the clearer in its extended position.

Similar letters of reference indicate corresponding parts in the two figures.

This invention consists in an improved mode of applying a clearer to a horse-rake, and in the manner of operating the same, whereby the action of clearing the teeth of said rake may be more readily and efficiently accomplished.

To enable others skilled in the art to which my invention appertains to fully understand and use the same, I will proceed to describe its construction and operation.

A represents an axle resting upon common wheels B, one only being shown in the drawings. The said axle constitutes, also, the rake-head, the teeth C being inserted in its rear side.

D is a strengthening-bar passing through the coil c of the rake-teeth and bolted to the axle at suitable intervals. The thills E and bed F are hinged to the upper side of the axle, near its rear edge, so that their weight and that of the driver upon his seat G will tend to hold the teeth down when in their working position. A rigid arm, H, projects upward from the rear side of the axle, and is connected by a rod, I, to the lower end of a vertical lever, J, which is fulcrumed at *j* in a standard upon the bed, in convenient proximity to the driver's seat.

K is a treadle or foot-bar depending from the lever J, and turned horizontally toward the center of the machine at its lower end, in convenient position to receive the foot of the operator.

L represents arms, which are rigidly secured to the standard M, and project in an oblique backward direction therefrom. These arms are formed with deflected ends, which pass through apertures n in a frame, N, so as to permit the latter to swing freely thereon.

O is the clearer-bar, attached to the lower part of the frame N, and provided with teeth o, projecting downward between the rake-teeth C, so as to clear the hay therefrom when the rake is elevated and the clearer extended, as hereinafter explained.

P represents a rod, which is attached at its respective ends to a staple, Q, on the upper part of the frame N and to the lower part of the lever J.

Operation: From the foregoing description it will be apparent that the weight of the driver and of the bed of the implement resting upon the rear edge of the axle tends to hold the teeth down and keep them in contact with the ground, while the draft of the horse, applied through the thills to the upper side of the axle, tends to turn it over and raise the teeth. These two opposing forces are so balanced that while the operation of raking is going on a very slight pressure upon the treadle K serves to keep the teeth in contact with the ground, and when it is desired to raise the teeth to discharge the accumulated hay it is only necessary to remove the foot from the treadle and apply a slight backward pressure of the hand upon the lever J to start the clearer and rake-teeth, when the former is thrown outward and the latter thrown up automatically, as shown in Fig. 2, and so held until restored to their working position.

I am aware that it is not new to impart a simultaneous motion to the teeth and clearer, and therefore do not desire to be understood as claiming this invention, broadly; but,

Having thus described my invention, what I claim as new therein, and desire to secure by Letters Patent, is—

The combination, with the teeth C, treadle K, levers J H, and connecting-rod I, of the pivoted frame N n, toothed clearer O o, and connecting-rod P, all constructed, arranged, and operating in the manner and for the purposes herein shown and described.

The above specification of my improvement in horse-rakes signed this 6th day of February, 1863.

S. C. BRINSER.

Witnesses:
BENJAMIN BOOZER,
JONAS C. BRINSER.